Aug. 14, 1956 R. N. WAGNER 2,759,151
DIRECT CURRENT METERING SYSTEM INCLUDING AN A.C. WATTHOUR METER
Filed Dec. 28, 1950

INVENTOR
Robert N. Wagner
BY
Howard B. Funk
ATTORNEY

United States Patent Office 2,759,151
Patented Aug. 14, 1956

2,759,151

DIRECT CURRENT METERING SYSTEM INCLUDING AN A. C. WATTHOUR METER

Robert N. Wagner, Pittsburgh, Pa., assignor to Aluminum Company of America, Pittsburgh, Pa., a corporation of Pennsylvania Application December 28, 1950, Serial No. 203,113

4 Claims. (Cl. 324—117)

This invention relates to a metering system for obtaining ampere hours of a direct current power circuit, and more particularly to the integration of amperes of a high voltage, high amperage direct current feeder or distribution bus by an induction watthour meter.

An object of the invention is to provide an integrating metering system or arrangement of the above described character which is accurate and stable in operation, simple and rugged in construction and of relatively low cost.

Another object of the invention is to provide a direct current metering arrangement which provides physical isolation between the power circuit and the metering circuit and which embodies an induction watthour meter as the measuring and integrating instrument together with means for actuating the instrument at a speed nearly equal to its A. C. rated unity power factor speed.

A further object of the invention is to provide simple and improved means for accurately recording the ampere hour consumption in relatively large D. C. loads of substantially constant voltage, as in D. C. electrolytic cell or pot line operation for aluminum production.

Further objects and advantages of the invention, particularly in the devices and circuits which result in integration of amperes of a D. C. power circuit with sustained accuracy over a wide current range will appear from the following description considered in connection with the accompanying drawing in which Fig. 1 is a view partly schematic and partly diagrammatic showing a preferred embodiment and Fig. 2 is a view of a portion of the meter of Fig. 1 showing an addition thereto.

Figure 1:
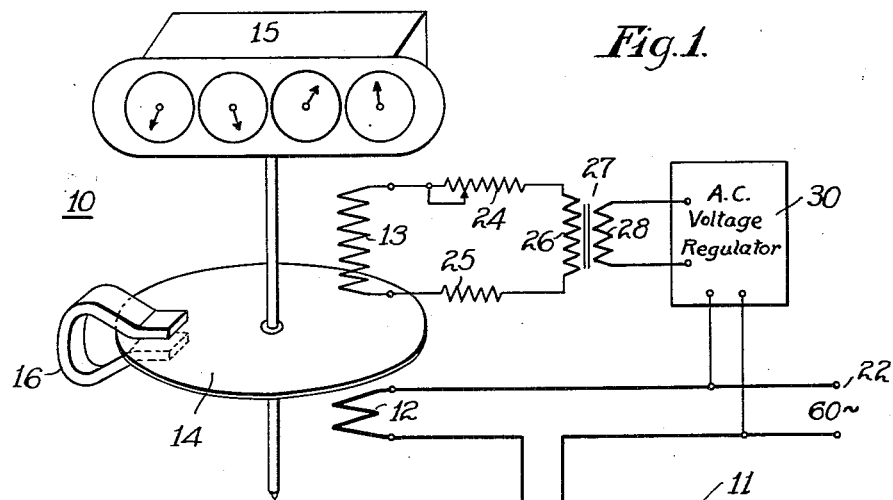
Figure 2:
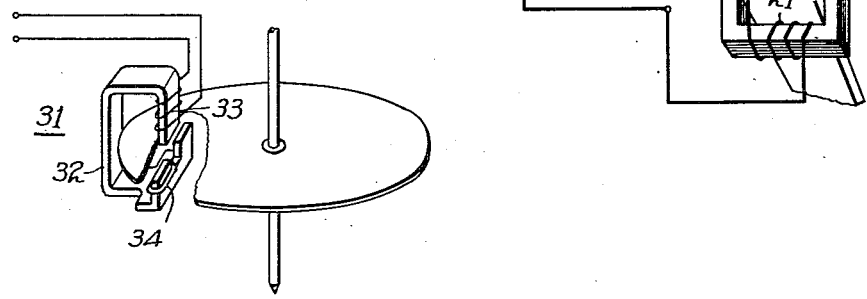

As indicated in Fig. 1 of the drawing, the system of this invention employs a standard single phase, induction type watthour meter 10 for metering the current flow through a D. C. power feeder or distribution bus, one side of which is represented by bar 11. Meter 10 includes the usual current and potential windings or coils 12 and 13, shaft and disc 14, register 15 and the drag or damping magnet 16. It also includes the various customary compensating or adjusting elements (not shown). The power circuit, in the case of electrolytic pot line operation, is adapted to carry relatively large amounts of current at high voltage, a 50,000 ampere circuit at 600 volts being typical. In order to provide an alternating current proportional to the current of the power circuit for energizing the current element or windings 12 of the meter, a transductor or saturable reactor 17 is utilized. This device is of the static type to avoid the complications of moving parts and comprises a pair of closed magnetic cores 18 and 19 through the open centers of which the bus bar or conductor 11 extends. The heavy current bus constitutes the direct current windings for these cores and provides the saturating flux which passes through them. The cores 18 and 19 carry alternating current windings or coils 20 and 21, respectively, which are connected in opposition or reverse polarity either in series as shown or in parallel. Any suitable A.-C. supply source 22, such as 110 volts, 60 cycles for example, is provided to which the coils 20 and 21 are connected in series with the current windings 12 of the watthour meter 10. The transductor thus inductively connects the current circuit of the meter with the D.-C. power circuit and current changes in the latter change the degree of saturation of the cores and hence the amount of alternating current in the current circuit, in a manner well understood in the art. The transductor is in effect a D. C. transformer passing a low value alternating current through its A.-C. windings which is proportional to the direct current flowing through the power circuit. For full load rating of the power circuit, the transductor will by proper design of its A.-C. windings supply the full load ampere rating of the meter 10.

The potential winding 13 of the meter has a voltage applied thereto from source 22, or an independent source of the same frequency, if desired, which source voltage for metering accuracy has a constant phase relation with the current in the transductor or current circuit. For best accuracy, the magnitude of the voltage applied to the potential coil 13 is substantially equal to the nominal rated voltage of the winding. If this potential coil voltage is exactly in phase with the current in the current circuit, the watthour meter will operate at a rated speed similar to what it would if connected to measure watts in a unity power factor A. C. load. By keeping the voltage supplied to the potential coil substantially constant, the only changes in speed of the rotor element of the meter, shaft and disc 14, will be caused by changes in current in the transductor or current circuit. Since current changes in this latter circuit are proportional to those occurring in the D. C. power line 11, the watthour meter becomes and constitutes an integrating device whose speed is proportional to current flow in the D. C. power line or, in other words, an amperehour meter. An amount less than exact phase relation will result in the instrument operating at a slower speed; but, by keeping the phase angle relatively small and constant, accurate calibration can be obtained.

To the foregoing ends, in the preferred embodiment of the invention, the potential coil 13 is connected through non-inductive series resistors 24 and 25 to the secondary winding 26 of a step-up transformer 27. These phase shifting resistors may be fixed or variable and they may be combined and disposed in one side of the circuit instead of being in both sides of the circuit, as shown. The arrangement shown is preferred because it has the advantage of enabling the circuit to be grounded, if desired, thereby lowering the potential to ground of all points of the circuit. To minimize temperature error, the resistors are made from material having a low temperature coefficient. The primary winding 28 of the transformer is connected to the supply source 22 and a voltage regulator 30 of any suitable well known construction is inserted in this primary supply circuit to maintain the voltage supplied to the primary 28 substantially constant. The winding 28 and the regulator 30 are suitably designed to operate at the voltage of supply 22 or any other supply voltage used.

The step-up ratio of transformer 27 is such as will impress, in comparison with the rated voltage for potential coil 13, a relatively high voltage across the resistors and that coil in series in order that the meter may be caused to rotate near its A. C. rated unity power factor speed, say 22 R. P. M. for a rated 25 R. P. M. meter at full load. The higher this voltage, the more closely the voltage impressed on the potential coil can be brought into phase with the current in the transductor circuit, with nominal rated voltage in the potential coil; but sustained, accurate performance is obtained by using a potential not in excess of 1000 volts when a meter with a 110 volt potential coil is used, a potential of between 600 and 800 volts being preferred. If a meter having a different potential coil rating is used, these voltages will of course be correspondingly correlated. Of this impressed voltage, the drop across the relatively non-inductive resistors is made high in ratio to the drop across the highly inductive potential coil 13, the ratio preferably being of the order of between 6 and 8 to 1. Thereby, the potential coil voltage is caused to approach 90° relation to the impressed voltage and consequently it is out of phase with respect to the current in the transductor circuit by only a relatively small phase angle which being known enables accurate calibration to be obtained. Of course, lower ratios and lower values of excitation of the potential coil will permit functioning of the meter, but the accuracy of the meter will fall off sharply and disproportionately if the meter's speed response at full load is made too low.

In this system, the potential circuit of the meter is thus continuously sustained with the conditions of phase relation and voltage in coil 13 substantially constant and with the voltage of potential coil 13 very nearly in phase with the current in the current or transductor circuit. Consequently, the driving torque produced in the disc by the interaction of the fluxes and the induced currents is at all times proportional to the voltage times current. Since the voltage is constant, the disc is driven at a speed proportional to current and the total number of revolutions over any given period will be proportional to the quantity of current in amperehours delivered through the D. C. power circuit.

In order that the meter will have a substantially straight line response characteristic throughout the current range of the power line 11, from full load to light load, the torque adjusting means in the meter may be adjusted, as is customary. If the needed compensation is outside the range of such adjusting means, the auxiliary torque element 31 of Fig. 2 is provided. This device comprises a C-shaped magnetic core 32 provided with a gap through which the disc passes. A small coil 33 is disposed on the upper single pole of the core and is energized from a constant or regulated A.-C. source. The core is formed with two poles facing the underside of the disc and a suitable closed loop shading coil 34 is provided on one of these lower poles. This shading coil is so arranged with respect to the flux of coil 33 as to cause the torque element to establish a creeping or shifting polar field in a direction to produce a small auxiliary reverse or opposing torque on disc 14 sufficient in value to compensate for transductor current output deviations, as encountered with different transductors, particularly in the registration of ampere hours in the light load range.

The system of this invention not only is characterized by the simplicity of its components and circuits, but by its sustained accuracy and reliability which results in ampere integration instead of mere indication of a D. C. power feeder bus. As a result, an accurate record in amperehours of the current delivered by the D. C. feeder circuit is attained and the difficulties attendant upon the use of direct current commutator type meters and the conventional current shunts are avoided.

What is claimed is:

1. An amperehour metering system for a direct current power circuit comprising an A.-C. induction watthour meter having a rotatable disc connected to a register, a current coil and a potential coil of 110 volt rating for producing driving torque in said disc, an alternating current source, means for supplying current from said source to the current coil of the meter proportional to the current in said power circuit comprising a pair of closed magnetic cores in inductive relation to one side of said power circuit and an A.-C. winding on each core connected with each other in opposition and to said A.-C. source in series with said current coil, means for applying substantially constant alternating voltage to the potential coil of said meter substantially in phase with the current in said current coil comprising a voltage regulator connected to said A.-C. source, a step-up transformer having its primary winding connected to said voltage regulator and its secondary winding connected to said potential coil and a non-inductive resistor connected in series with said potential coil and said secondary winding, said transformer providing between 600 to 800 volts secondary output absorbed in resistive to reactive voltage drop across said resistor and said potential coil respectively at a ratio of between 6 and 8 to 1, and an auxiliary torque element cooperating with said disc in opposition to said driving torque comprising a shaded pole C-shaped magnetic core providing upper and lower poles between which the disc passes and a continuously energized coil on the C-shaped core.

2. An induction metering system for a direct current power circuit comprising a standard induction watthour meter having current and potential coils producing a rated A.-C. unity power factor meter speed with said potential coil energized at its rated voltage and the voltage in phase with the current in said current coil, a transductor including a pair of saturable cores with an A.-C. winding on each core connected in opposition, an alternating current supply circuit connected to said windings and to said current coil in series, winding means operatively associated with said cores and energized from said direct current power circuit for subjecting said cores to unidirectional magnetizing force responsively to a D.-C. quantity of said direct current power circuit, said transductor translating said D.-C. quantity into a proportional alternating current traversing said current coil for measurement by said meter, means including an alternating voltage supply circuit, of the same frequency as said alternating current supply circuit, connected to said potential coil for impressing thereon a voltage equal to said rated voltage and substantially in phase with the current in said current coil, and voltage regulating means connected between said alternating voltage supply circuit and said potential coil to maintain the voltage impressed on said potential coil substantially constant, whereby said meter responds at substantially its said rated speed only to and for all values of current traversing said current coil.

3. An induction metering system for a direct current power circuit comprising a standard induction watthour meter having current and potential coils producing a rated A.-C. unity power factor meter speed with said potential coil energized at its rated voltage and the voltage in phase with the current in said current coil, a transductor including a pair of saturable cores with an A.-C. winding on each core connected in opposition, an alternating current supply circuit connected to said windings and to said current coil in series, winding means operatively associated with said cores and energized from said direct current power circuit for subjecting said cores to unidirectional magnetizing force responsively to a D.-C. quantity of said direct current power circuit, said transductor translating said D.-C. quantity into a proportional alternating current traversing said current coil for measurement by said meter, and means for rendering said meter responsive at substantially its said rated speed to the current traversing said current coil only comprising a phase shifting circuit consisting of non-inductive resistance and said potential coil in series, having a resistive to reactive voltage drop ratio of at least 8 to 1 to shift the voltage impressed on said potential coil closely into phase with the current in said current coil, a transformer for energizing said phase shifting circuit from said A.-C. supply circuit, and voltage regulating means for maintaining the voltage impressed on said phase shifting circuit substantially constant, said transformer providing an output voltage of a magnitude correlated to said voltage drop ratio and sufficient to energize said potential coil at its said rated voltage.

4. An amperehour metering system for a direct current power circuit comprising an A.-C. induction watthour meter having a rotatable disc driving a register, a current coil and a potential coil producing driving torque in said disc and a rated A.-C. unity power factor meter speed with said potential coil energized at its rated voltage and the voltage in phase with the current in said current coil, a conductor constituting one side of said power circuit, a current transductor comprising a pair of saturable cores with an A.-C. winding on each core connected in opposition, an alternating current source connected to said windigs and to said current coil in series, said conductor extending in inductive relation through said cores and constituting a single turn D.-C. winding therefor, said transductor translating the direct current flowing in said conductor into a proportional alternating current traversing said current coil for integration by said meter, and means for applying substantially constant alternating voltage to said potential coil of a magnitude equal to its said rated voltage and substantially in phase with the current in said current coil, to render the meter responsive at substantially its said rated speed for all values of current traversing said current coil, said means consisting of a voltage regulator connected to said A.-C. source, a step-up transformer having its primary connected to said regulator and its secondary connected to said potential coil in series with a non-inductive resistance, said resistance providing a voltage drop thereacross greater than the voltage drop across said potential coil in a ratio of between 6 and 8 to 1, and said transformer providing an output voltage of a magnitude sufficient to apply said rated voltage on said potential coil.

References Cited in the file of this patent

UNITED STATES PATENTS

| | | |
|---|---|---|
| 2,136,251 | Pratt | Nov. 8, 1938 |
| 2,218,668 | Wagner | Oct. 22, 1940 |
| 2,324,307 | Lynch | July 13, 1943 |
| 2,338,423 | Geyger | Jan. 4, 1944 |
| 2,454,201 | Petzinger et al. | Nov. 16, 1948 |
| 2,531,811 | Hammel | Nov. 28, 1950 |
| 2,614,139 | Baxter | Oct. 14, 1952 |

FOREIGN PATENTS

| | | |
|---|---|---|
| 272,748 | Germany | Apr. 8, 1914 |
| 302,720 | Germany | Jan. 7, 1917 |